United States Patent [19]

Byron et al.

[11] Patent Number: 4,915,469

[45] Date of Patent: Apr. 10, 1990

[54] ACTIVE OPTICAL FIBRE STAR COUPLERS

[75] Inventors: Kevin C. Byron; Philip W. Black, Bishop's Stortford; Terry Bricheno, Great Sampford; John S. Leach, Bishop's Stortford, all of England

[73] Assignee: STC PLC, London, England

[21] Appl. No.: 325,788

[22] Filed: Mar. 20, 1989

[30] Foreign Application Priority Data

Mar. 26, 1988 [GB] United Kingdom ............... 8807274

[51] Int. Cl.⁴ ............................................. G02B 6/28
[52] U.S. Cl. .............................. 350/96.16; 350/96.15
[58] Field of Search .................................... 350/96.16

[56] References Cited

U.S. PATENT DOCUMENTS

| | | | |
|---|---|---|---|
| 3,912,364 | 10/1975 | Hudson | 350/96.16 |
| 3,937,557 | 2/1976 | Milton | 350/96.16 |
| 4,072,399 | 2/1978 | Love | 350/96.16 |
| 4,087,315 | 5/1989 | Auracher et al. | 350/96.12 X |
| 4,092,059 | 5/1978 | Hawkes et al. | 350/96.16 |
| 4,330,170 | 5/1982 | Johnson et al. | 350/96.16 |
| 4,360,248 | 11/1982 | Bickel et al. | 350/96.16 |
| 4,362,357 | 12/1982 | Stockmann et al. | 350/96.16 |
| 4,423,924 | 1/1984 | Braun | 350/96.16 |
| 4,457,581 | 7/1984 | Johnson et al. | 350/96.16 |
| 4,590,619 | 5/1986 | Winzer | 456/612 |
| 4,687,284 | 8/1987 | Rawson et al. | 350/96.16 |
| 4,826,275 | 5/1989 | Heinzman | 350/96.16 |
| 4,863,231 | 9/1989 | Byron et al. | 350/96.16 |
| 4,365,864 | 12/1989 | Cowley et al. | 350/96.15 X |

Primary Examiner—John D. Lee
Assistant Examiner—Phan T. Heartney
Attorney, Agent, or Firm—Lee, Mann, Smith, McWilliams & Sweeney

[57] ABSTRACT

An optical fibre star coupler in which the mixer element (11, 21, 45) exhibits optical gain. This allows the use of couplers having a relatively large number of outputs without the requirement for an excessive power level for any input signal.

5 Claims, 3 Drawing Sheets

ACTIVE OPTICAL FIBRE STAR COUPLERS

BACKGROUND OF THE INVENTION

This invention relates to optical fibre star couplers. In a conventional star coupler the power in a signal applied to the coupler via a single optical fibre is shared substantially equally between the members of a set of output fibres, this sharing being effected by means of a mixer element interposed optically between the input and output fibres. In a "transmissive" type star coupler one or more input fibres are optically coupled with one end of the mixer element, while the members of the set of output fibres are optically coupled with the other end of the mixer element. In a "reflective" type of star coupler all the fibres are optically coupled with one end of the mixer element whose opposite end is designed to be totally reflecting. Thus in the transmission type star coupler optical power input to the coupler on any one of a first set of (input) fibres is shared substantially equally between the members of a second set of (output) fibres, whereas in the reflective type of coupler optical power input to the coupler on any one of a set of fibres is shared substantially equally between all members of that same set of fibres.

When star couplers are used in large networks that require the input signal to be shared by the coupler between a large number of output ports it is evident that the amount of power available for any single output port is going to be very low if the input signal power is not going to be correspondingly very high. The use of very high power optical transmitters is however undesirable because it presents a potential optical safety hazard should connectors in the optical path between the source and the star coupler become uncoupled.

SUMMARY OF THE INVENTION

Accordingly, it is a general object of the present invention to avoid the disadvantages of the prior art.

More particularly it is an object of the present invention to provide an optical fibre star coupler which can be employed in optical fibre networks in a manner permitting distribution of optical power between a relatively large number of different fibres in a network without the necessity of having dangerously large amounts of power in any single one of the fibres of that network.

According to the present invention there is provided an optical fibre star coupler having an optical mixer element and means for optically coupling the mixer element with a plurality of optical fibres, which mixer element is provided with means for rendering it optically amplifying.

BRIEF DESCRIPTION OF THE DRAWINGS

There follows a description of star couplers embodying the invention in preferred forms. This description refers to the accompanying drawings in which.

DETAILED DESCRIPTION OF PREFERRED EMBODIMENTS

Figure 1:
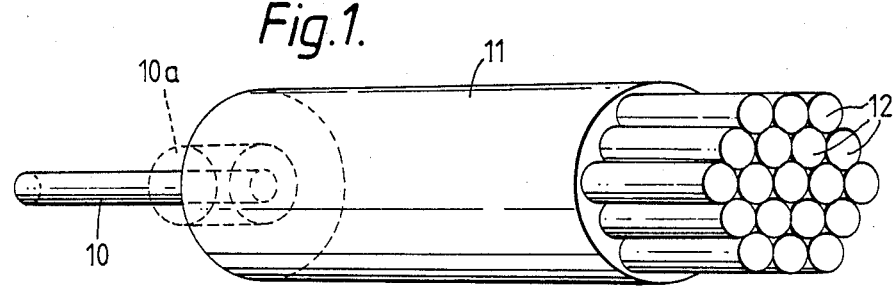
FIG. 1 depicts a × n star coupler.

In the transmissive type star coupler of FIG. 1 a single input fibre 10 has its end butted against one end of a glass mixer rod 11. Against the other end of this mixer rod are butted the ends of a bundle of n output fibres 12. So far in this description the star coupler has not been distinguished from known forms of transmissive type star couplers. However unlike such known forms of coupler, the mixer rod of this coupler is made of a material, such as NdYag, which is capable of being optically pumped in order to provide optical amplification by stimulated emission. The mixer rod is thus like the optically amplifying medium of a NdYag laser, except for the fact that in this instance the rod is not provided with highly reflective end facets, but instead is provided with facets at which Fresnel reflection is minimized in order to suppress laser action. The mixer rod is optically pumped (by means not shown) in a manner already known, for instance by flash lamp or by semiconductor laser array, for the optical pumping of NdYag lasers.

Figure 2:
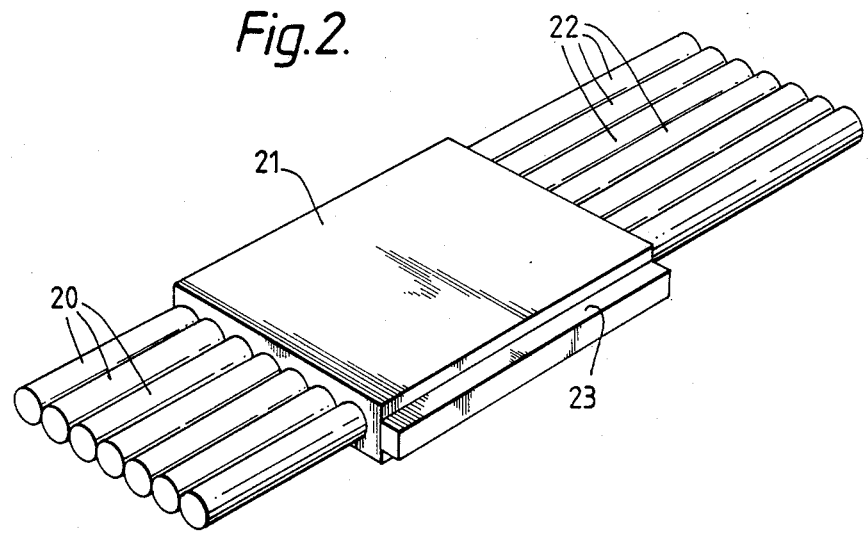
FIG. 2 depicts an n × n star coupler.

The star coupler of FIG. 2 is an n × n coupler which uses a slab-shaped mixer element 21 against opposite ends of which are butted the ends of two sets 20 and 22 of n optical fibres. Like the mixer rod 11 of FIG. 1, the mixer element 21 of FIG. 2 is made of a material which is capable of being pumped to render it optically amplifying. Along one side edge of the mixer element is located optical pumping means 23, which in the case of a mixer element made of NdYag, may for instance be constituted by a semiconductor diode array.

Figure 4:
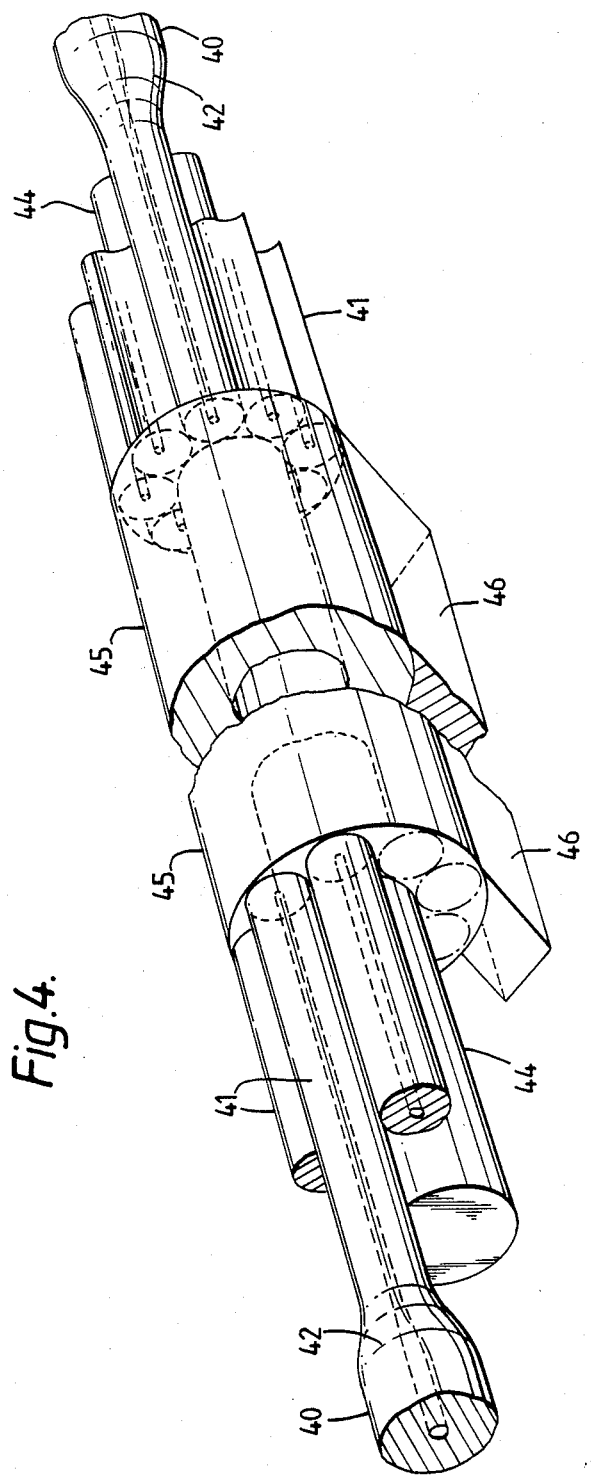
FIG. 4 depicts an n × n single mode fibre star coupler.

The star coupler of FIG. 4 is also an n × n coupler, but in this instance the mixer element is annular and the coupler is designed for use with single mode fibres. Using a mixer element for single mode fibre appears unattractive, at least when first considered, for at least two reasons. First, the insertion loss associated with the 'packing fraction', defined as the inverse of the ratio of the area occupied by the aggregate fibre spots to the total area of the end face of the mixer element, appears to be prohibitively high. Second, a typical multimode fibre will guide hundreds of modes which, when launched into a mixer element, will produce a uniform distribution of light at the output end. On the other hand, the single mode in monomode fibre, when launched into such a mixer element is liable to excite a limited population of mode which results in very poor uniformity at the output end of the mixer element revealed as a coarse speckle pattern with preferential bright spots. However these apparent disadvantages can be accommodated in a manner explained in detail in the specification of Pat. Application No. 87 18055 which discloses how the problem of packing fraction may be substantially alleviated and how the modal 'speckle' effects may be turned to advantage.

In that specification it is explained that a typical single mode optical fibre developed for telecommunications use has an OD of 125 $\mu$m and a mode spot diameter of 10 $\mu$m. This gives a ratio of about 1 : 150 for the area of the mode spot to that of the fibre. If such a fibre is adiabatically tapered to a smaller size by a drawing operation, the mode spot size increases as the fibre OD is reduced. By the time the OD is reduced to about 50 $\mu$m, the spot size has increased to about 25 $\mu$m. At this stage the light is still guided by the core cladding interface, and is substantially unaffected by the refractive index of material surrounding the fibre. Below about 45

μm OD, the power has spread sufficiently to be significantly affected by the nature of the interface between the fibre and its surroundings, and if these surroundings are of lower refractive index, then this interface takes over the waveguiding function, and tends, at least temporarily, to limit further spreading of the mode spot size.

Therefore the packing fraction of a conventional telecommunications fibre can be readily greatly increased by means of a taper to about 1 : 4 by drawing the fibres down to a diameter of about 50 μm. Provided that the taper is adiabatic, this improvement in packing fraction is obtained without incurring any loss penalty, and such tapers can very readily be fabricated using the equipment and basic progressive stretching technique described in GB 2 150 703B in relation to the manufacture of fused taper couplers.

Attention will now be turned to the response of an annular mixer element to the injection of a Gaussian spot of light normally into a portion of one of its end faces. The light will spread out as it travels down the mixer element such that after a distance z the spot size is given by
"$W = W_o(1 + \lambda^2 z^2 / (\pi W_o^2 n))^{\frac{1}{2}}$" Where $W_o$ is the spot size at $z = 0$ $\lambda$ is the wavelength, and n is the refractive index The half-angle divergence (in radians) of the beam is given by:

$$\phi = \lambda / (\pi W_o n)$$

Therefore, for a 25 μm spot of 1.3 μm wavelength light propagating in silica (n = 1.447s) the beam divergence is 1.31°.

Initially the power will spread out around the annulus, and after a certain distance will begin to overlap back onto itself. Because the light originates from a single source, the overlapping portions are coherent, and an interference pattern is created.

Figure 3:
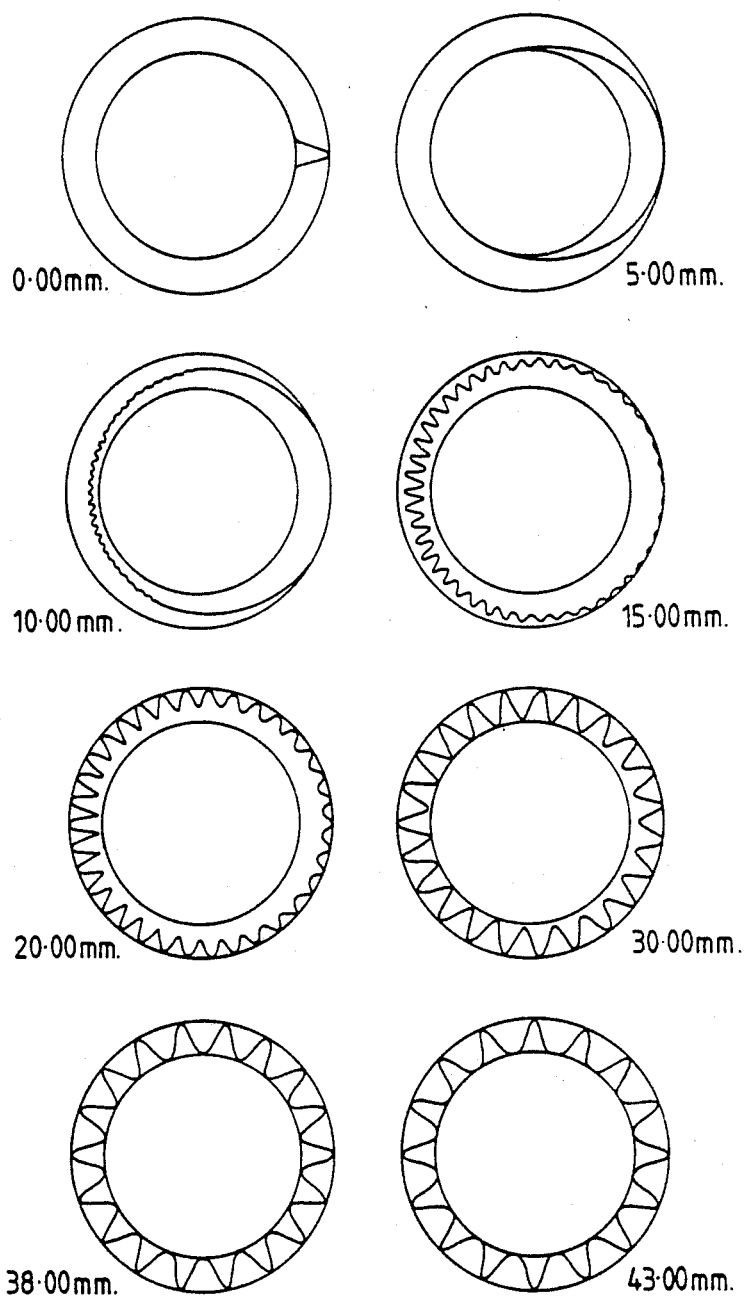
FIG. 3 is a series of plots showing how the pattern of light intensity varies as a function of distance down an annular mixer element when launched into that element as a Gaussian spot at one sectorial position on its end face.

A computer program to model this propagation has been used to provide the plots of FIG. 3 which shows the predicted interference patterns for 1.3 μm wavelength light at 0mm, 5mm, 10mm, 20mm, 30mm, 39mm and 43mm along an annular silica mixer element of 280 μm OD with a 30 μm wall thickness. The line contours represent the light intensity using a normalized scale and the inner ring as the zero level. At 30mm the first regular pattern with high contrast fringes appears, and thereafter a high contrast regular pattern appears every few millimeters, the number of output spots gradually diminishing.

To form an n × n star coupler as schematically depicted in FIG. 4, n fibres 40 are progressively stretched using the technique described in GB 2 150 703B to produce parallel-sided reduced diameter regions 41. Between pairs of adiabatic tapers 42 these parallel-sided reduced diameter regions of the n fibres are clamped around a silica former 44 which is dimensioned so that the fibres form a close packed array with the former, each fibre being aligned parallel with the former in line contact with its two immediate neighbors and with the former. The resulting sub-assembly is then glued together, sawn in half, and has its sawn ends polished.

The polished end of one sub assembly half is butted up against one end, the input end, of an annular mixer element 45 of appropriate dimensions and is aligned so that when light is launched into the large diameter end of any one of its n fibres, the input fibres, a pattern of n spots of substantially equal intensity is generated at the other end, the output end, of the mixer element. By way of example, for 1.3 μm wavelength light launched into a mixer element with a refractive index matching that of fused silica, with an OD of 180 μm and a wall thickness of 50 μm the appropriate length of the mixer for producing eight-fold symmetry is 23mm. The other sub-assembly half is then butted up against this output end and its position adjusted to optimize the launching of the light from the mixer element into the fibres of this second sub-assembly half with substantially equal excitation of each one of these fibres. Index matching adhesive is then applied to the interfaces between the mixer guide and the two sub assembly halves.

Like the mixer rod 11 of FIG. 1 and the mixer element 21 of FIG. 2, the mixer element 45 of FIG. 4 is made of a material which is capable of being pumped to render it optically amplifying, and along a portion of one of the exterior curved surfaces of the mixer is located optical pumping means 46, which in the case of a mixer made of NdYag, may for instance be constituted by a semiconductor diode array. Two or more such arrays may be employed if desired disposed at equally spaced intervals around the mixer element.

In the foregoing examples of star coupler described with specific reference to the drawings, one end of each of the optical fibres 10, 12, 20, 22, and 40 is butted against its associated optical mixer element while its other end is left free for connecting the star coupler into an optical fibre network (not shown) for instance by fusion splicing or, if a demountable coupling is required, by means of optical fibre connectors (not shown). In this way the fibres 10, 12, 20, 22, and 40 constitute coupling means by which the fibres of the network with which the star coupler is to be connected are coupled with the mixer element. It should however be appreciated that in certain circumstances it may be desired to couple one or more of the fibres of the network directly to the mixer element rather than via the intermediary of an intervening length of fibre. Thus in the case of the star coupler of FIG. 1 the use of an intermediate length of fibre 10 can be dispensed with and it place taken by the input fibre of the network itself this fibre being optically coupled with a socket 10a (shown in broken outline) mounted directly on the end face of the mixer element 11.

We claim:

1. An optical fibre star coupler having an optical mixer element and means for optically coupling the mixer element with a plurality of optical fibres, which mixer element is made of material capable of being pumped to render the mixer element optically amplifying, and is provided with pumping means for rendering it optically amplifying.

2. A star coupler as claimed in claim 1 wherein said means for optically coupling the mixer element with a plurality of optical fibres is itself constituted by a set of optical fibres.

3. A star coupler as claimed in claim 2 wherein the set of optical fibres is a set of single mode optical fibres, each member of which set includes an adiabatic taper between its two ends.

4. A star coupler as claimed in claim 3 wherein the mixer element is annular.

5. A star coupler as claimed in claim 4 wherein the means to render the mixer element optically amplifying is constituted by one or more semiconductor diode arrays.

* * * * *